US006769705B1

(12) United States Patent
Schlangen

(10) Patent No.: US 6,769,705 B1
(45) Date of Patent: Aug. 3, 2004

(54) WHEELCHAIR

(76) Inventor: Phillip E. Schlangen, 1920 S. First St., No. 1601, Minneapolis, MN (US) 55454

( * ) Notice: Subject to any disclaimer, the term of this patent is extended or adjusted under 35 U.S.C. 154(b) by 0 days.

(21) Appl. No.: 10/310,151

(22) Filed: Dec. 4, 2002

Related U.S. Application Data

(60) Provisional application No. 60/336,667, filed on Dec. 4, 2001.

(51) Int. Cl.[7] .................................................. B62M 1/14

(52) U.S. Cl. ................................ 280/250.1; 280/304.1; 297/DIG. 4

(58) Field of Search ........................... 280/250.1, 304.1; 180/907; 297/DIG. 4, 452.2, 452.4

(56) References Cited

U.S. PATENT DOCUMENTS 4,989,920 A 2/1991 Kauzlarich et al.
5,139,309 A 8/1992 Kornreich
5,143,391 A * 9/1992 Robertson et al. ....... 280/250.1
5,145,197 A 9/1992 Gatti
5,186,480 A 2/1993 Morgan et al.
5,209,509 A * 5/1993 Gay et al. ................ 280/304.1
5,253,888 A * 10/1993 Friedrich ................. 280/250.1
5,409,247 A * 4/1995 Robertson et al. ....... 280/250.1
5,480,172 A 1/1996 James
5,564,786 A * 10/1996 Peek et al. ............... 297/452.4
5,593,173 A * 1/1997 Williamson ................. 280/642
5,743,545 A * 4/1998 Kunze et al. ............ 280/250.1
6,357,776 B1 * 3/2002 Goertzen et al. ........ 280/304.1
6,375,209 B1 * 4/2002 Schlangen ............... 280/250.1

* cited by examiner

*Primary Examiner*—Lesley D. Morris
*Assistant Examiner*—L. Lum

(57) ABSTRACT

A wheelchair has a frame assembly with longitudinal beams having grooves accommodating connecting members that retain the connecting members without welds on the beams. Expansion devices hold the connecting members in fixed positions on the beams. Supports secured to the connecting members are attached to wheels, a back rest, and a foot rest assembly.

21 Claims, 8 Drawing Sheets

FIG. 4
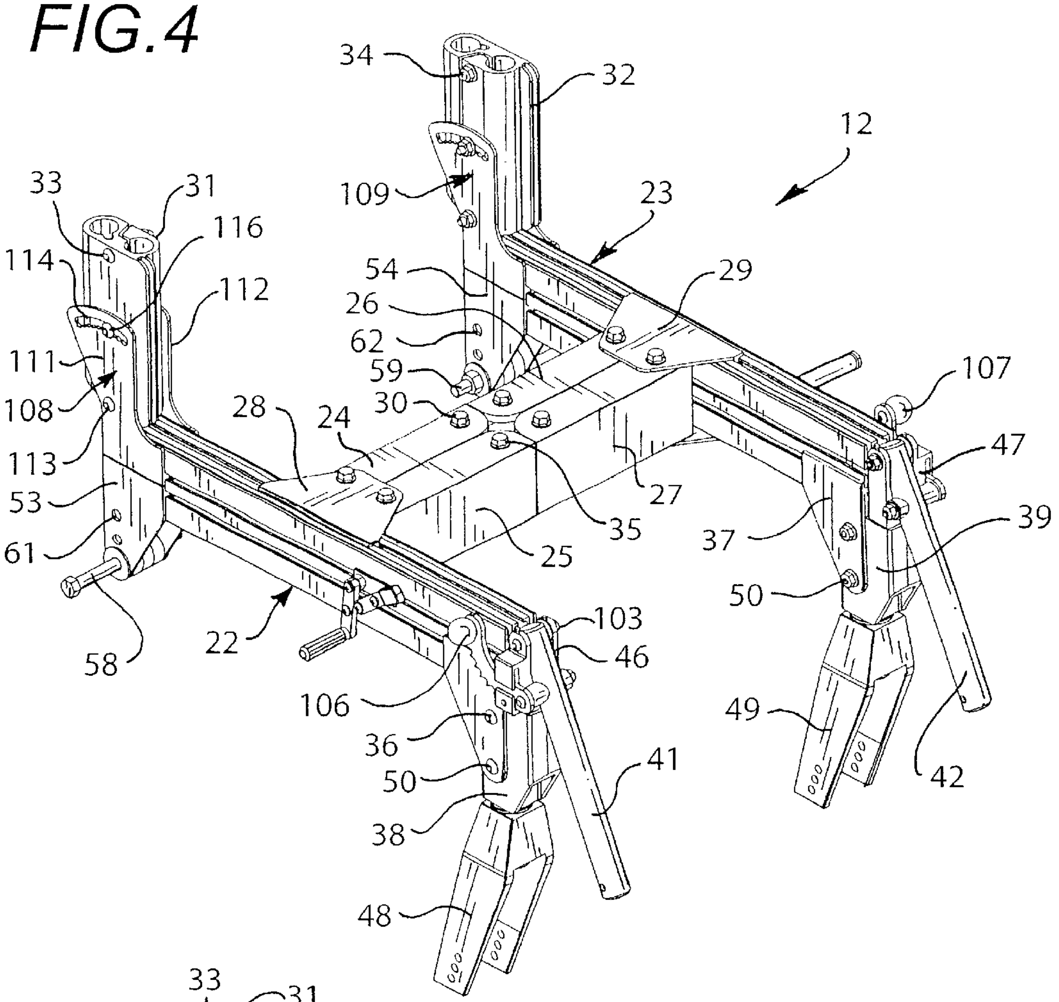
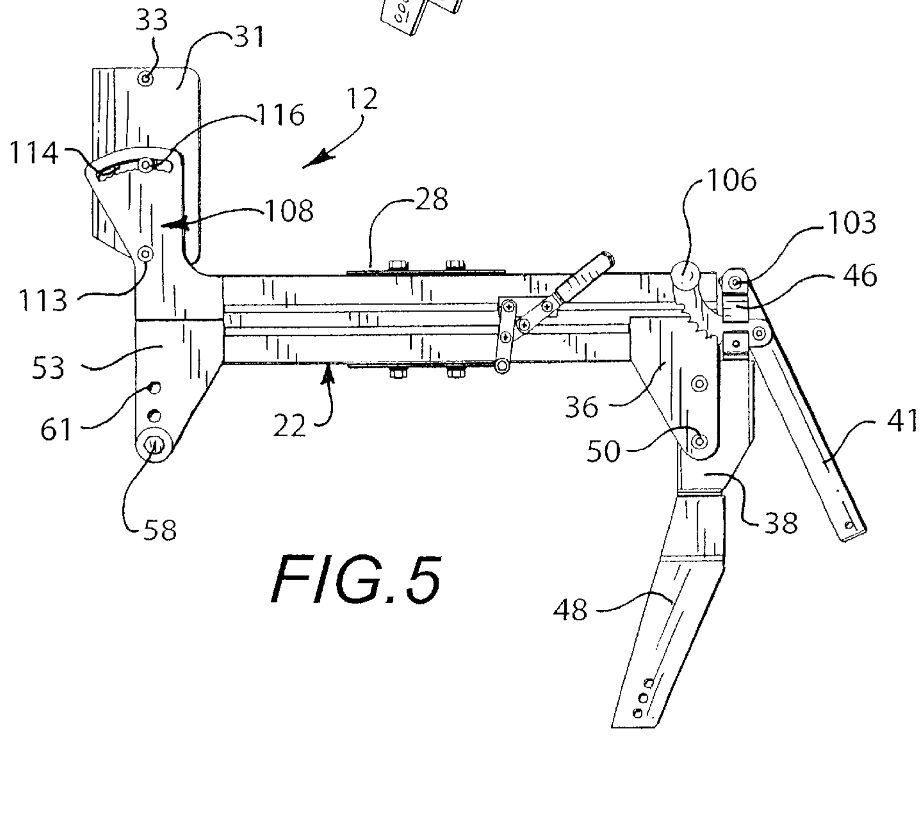
FIG. 5

WHEELCHAIR

CROSS REFERENCE TO RELATED APPLICATIONS

This application claims priority under 35 U.S.C. 119 (e) of U.S. Provisional Application Serial No. 60/336,667 filed Dec. 4, 2001.

FIELD OF THE INVENTION

The invention is in the art of wheelchair construction having seat, frame and foot rest assemblies connected together without welds. Main wheels and caster wheels connected to the frame support the wheelchair on a floor or similar surface.

BACKGROUND OF THE INVENTION

Conventional wheelchairs have metal frames of tubular members secured together with welds. The welding of wheelchair frames is labor intensive and an expensive fabrication operation. The parts of the welded wheelchair frames are not adjustable to allow for different wheelchair sizes and dimensions. Separate frames must be constructed for different wheelchair sizes and shapes. Welded wheelchair frames are not repaired in the user's location as they are sent to a welding shop or manufacturer for repairs and part replacements. A replacement wheelchair must be available to accommodate the wheelchair user.

SUMMARY OF THE INVENTION

The wheelchair of the invention has releasable connecting parts that allow for wheelchair length and height adjustments and part replacement. Welded joints are not used in the construction of the wheelchair. The wheelchair has a frame assembly comprising a pair of longitudinal beams connected with cross links. Front and rear supports are releasable connected to the beams. Large wheels rotatably mount on the rear supports are usable to hand drive the wheelchair. Caster wheels attached to the front supports allow the wheelchair to turn on a surface. The beams support a foot rest assembly usable to accommodate the legs and feet of a person seated on the wheelchair.

An embodiment of the wheelchair has seat, frame, and foot rest assemblies that are releasably connected with supports without welding members together. The frame assembly has longitudinal beams having longitudinal grooves accommodating connecting members joined to the supports. The beams are extruded metal members. The connecting members cooperate with expansion devices to hold the connecting members in fixed positions on the beams. The expansion devices are expansion bars that are compressed with nut and bolt assemblies to force the connecting members into tight fit or non-moving engagement with the beams. The tight fit engagement of the connecting members with the beams eliminates relative movement and resulting noise or rattle. The expansion devices can be released to permit removal of the supports from the beams for repair or replacement. The supports are easy to assemble on the beams. The supports have downwardly directed plates that accommodate transverse axles for the wheels of the wheelchair. The plates have vertically spaced holes for the axles whereby the wheels of the wheelchair can be vertically adjusted relative to the frame assembly. The beams are connected with a cross linkage that allows the wheelchair to be folded to a side-by-side position.

DESCRIPTION OF THE DRAWING

FIG. 4 is a perspective view of the frame assembly of the wheelchair of FIG. 1;

FIG. 5 is a side elevational view of FIG. 4;

DESCRIPTION OF THE INVENTION

Figure 1:
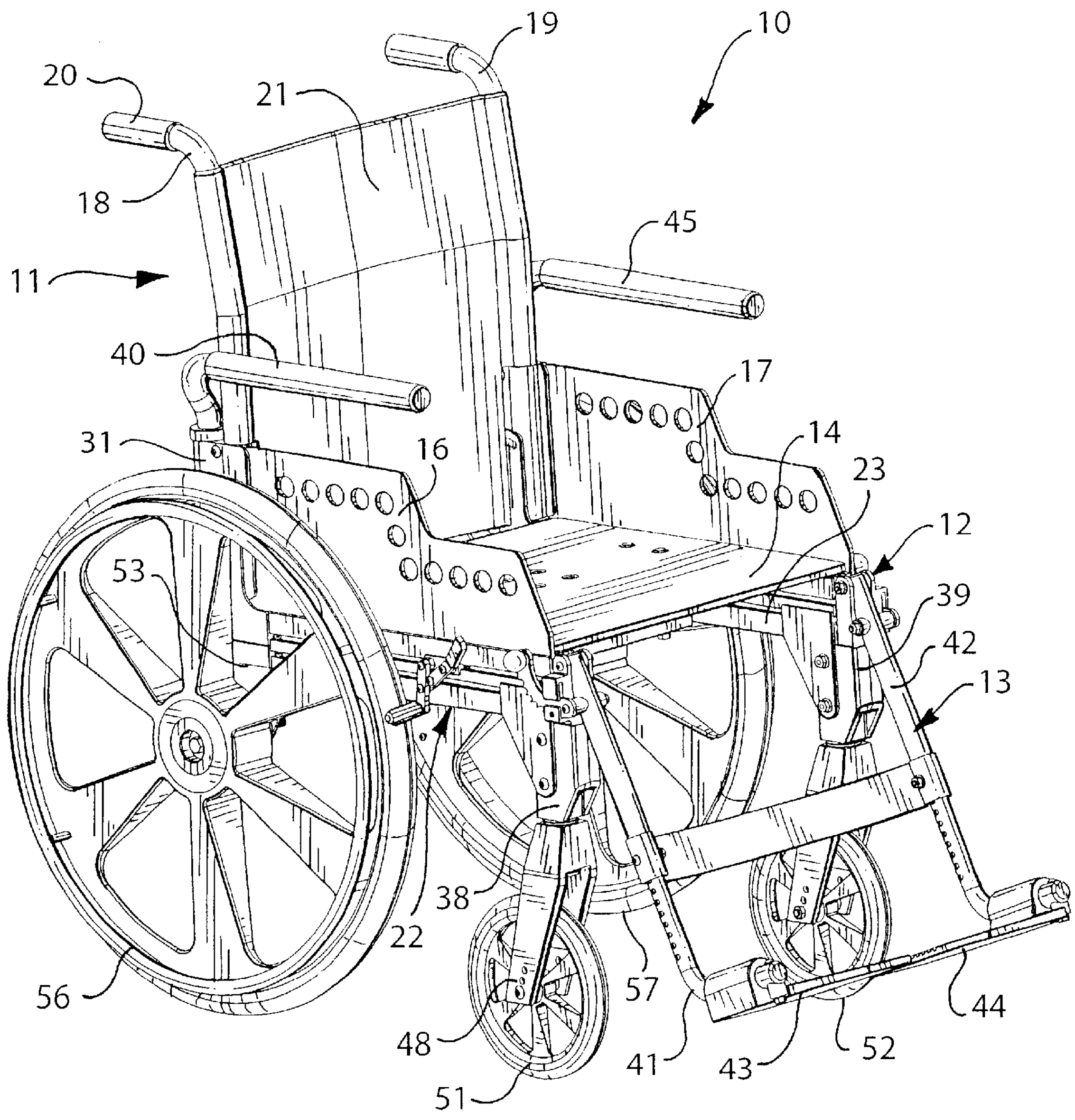
FIG. 1 is a perspective view of a wheelchair of the invention.
Figure 2:
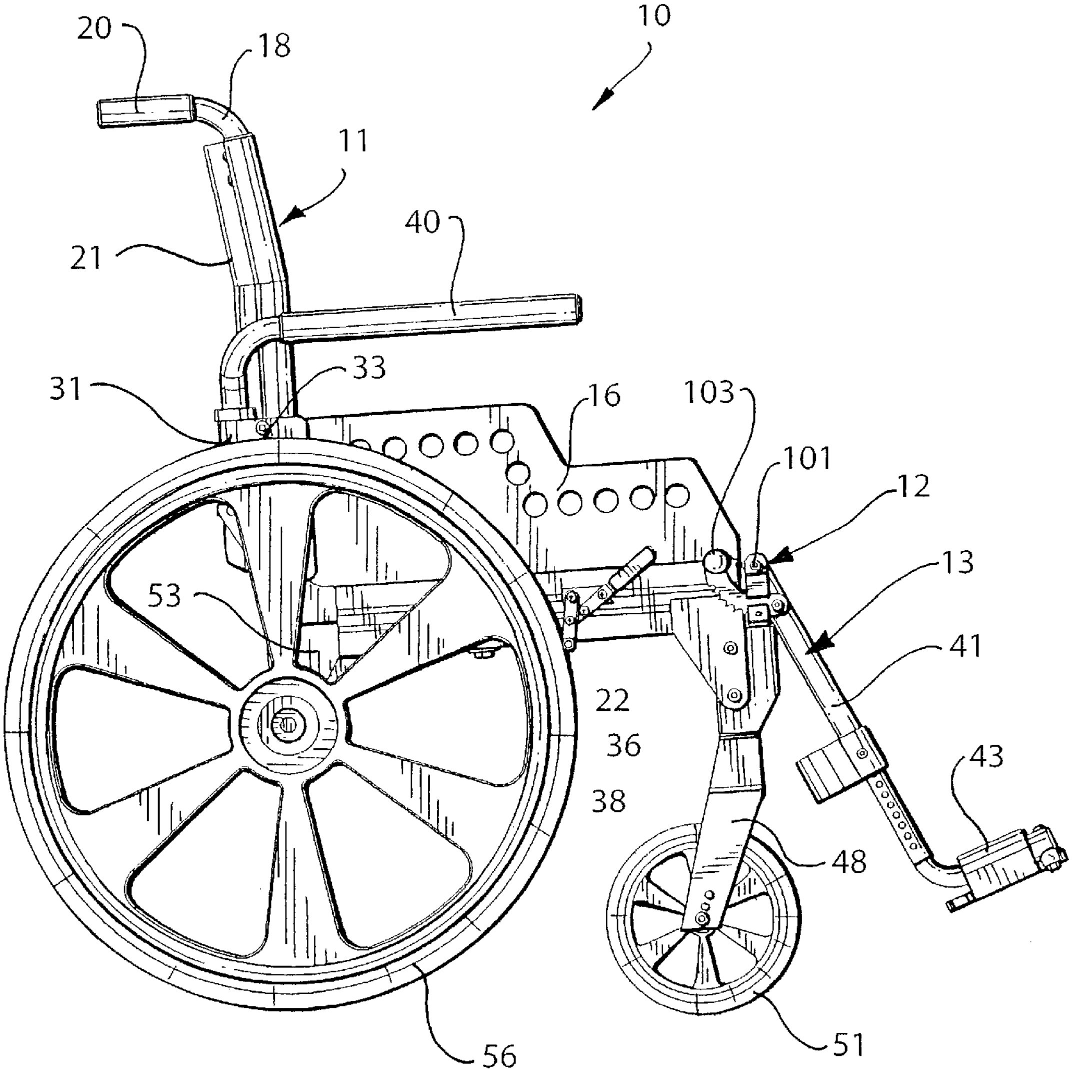
FIG. 2 is a side elevational view of the wheelchair of FIG. 1.

A wheelchair 10, shown in FIGS. 1 and 2, has a seat assembly 11 mounted on a frame assembly 12. A foot rest assembly 13 is attached to the front of the frame assembly 12. The seat, frame and foot rest assemblies are connected without welding members together.

Seat assembly 11 has a base plate 14, upright side members 16 and 17 located adjacent opposite longitudinal sides of plate 14. Upright posts 18 and 19 are secured to upright supports 31 and 32 located rearwardly of members 16 and 17. Back members 21, such as flexible sheet members, mounted on posts 18 and 19 function as a back rest of seat assembly 11. Posts 18 and 19 have rearwardly extended handles 20 used by persons to move wheelchair 10.

Frame assembly 12 has beams 22 and 23 connected to foldable links 24, 25, 26 and 27 that allow wheelchair 10 to fold to a side-by-side position. Connectors 28 and 29 mounted on beams 22 and 23 attach links 24 and 25 to beam 22 and attach links 26 and 27 to beam 23. Links 24 and 25 are pivotally connected to connector 28. Links 26 and 27 are pivotally connected to connector 29. Links 24 and 26 are pivotally connected with a flat bar having holes for the pivot bolts 30 (not shown). Lines 26 and 27 are pivotally connected with a flat bar having holes for the pivot bolts 25 (not shown). Supports 31 and 32 mounted on the rear ends of beams 22 and 23 have cylindrical bores that accommodate the lower ends of posts 18 and 19. Each support has a split groove that allows the support to be changed onto the lower end of a post. Bolts 33 and 34 extend through supports 31 and 32 to clamp posts 18 and 19 on supports 31 and 32. Supports 31 and 32 have second upright cylindrical bores accommodating downwardly directed sections of arm rests 40 and 45.

Figure 3:
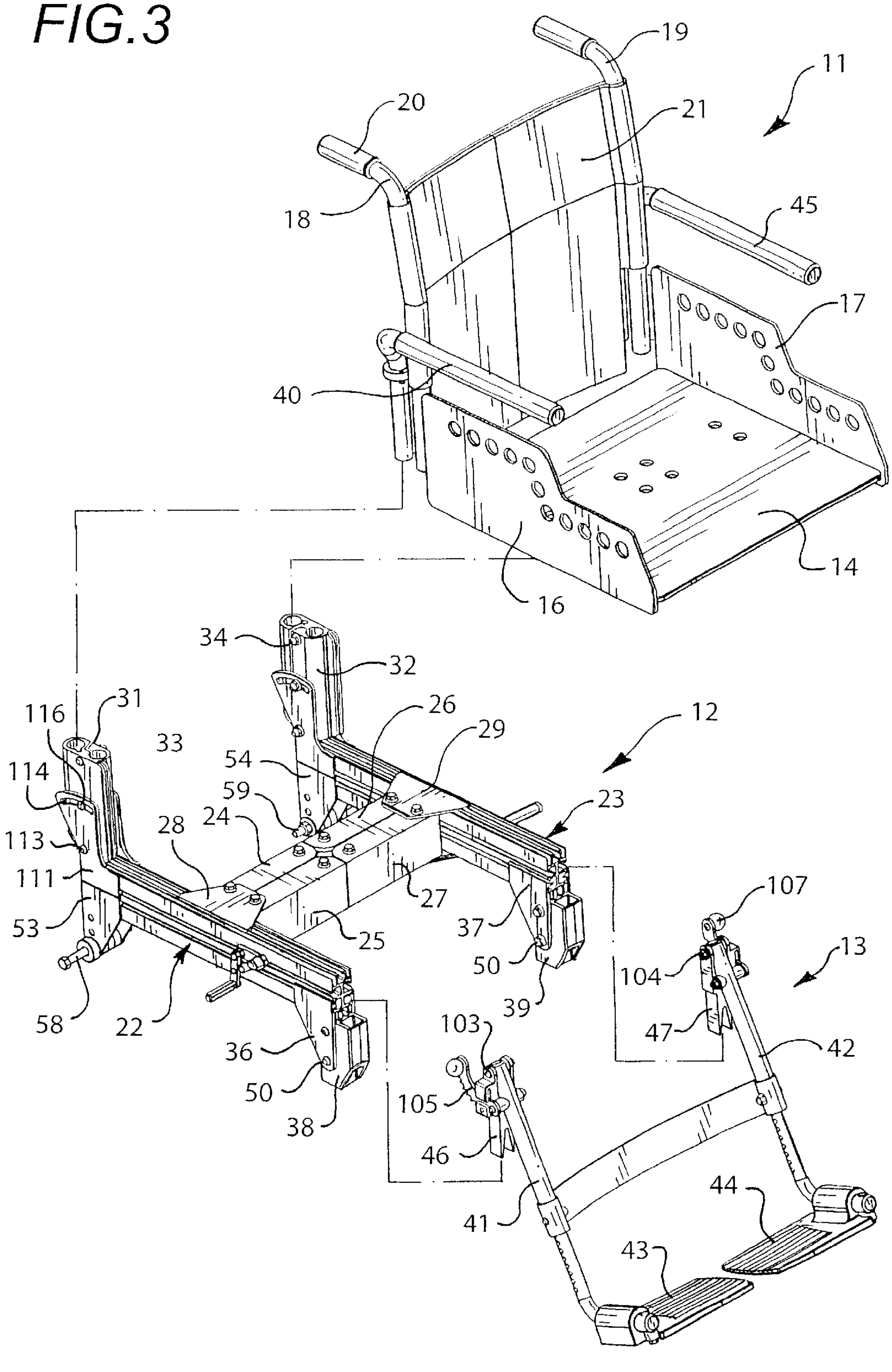
FIG. 3 is an exploded perspective view of the seat assembly, frame assembly and foot assembly of the wheelchair of FIG. 1.
Figure 6:
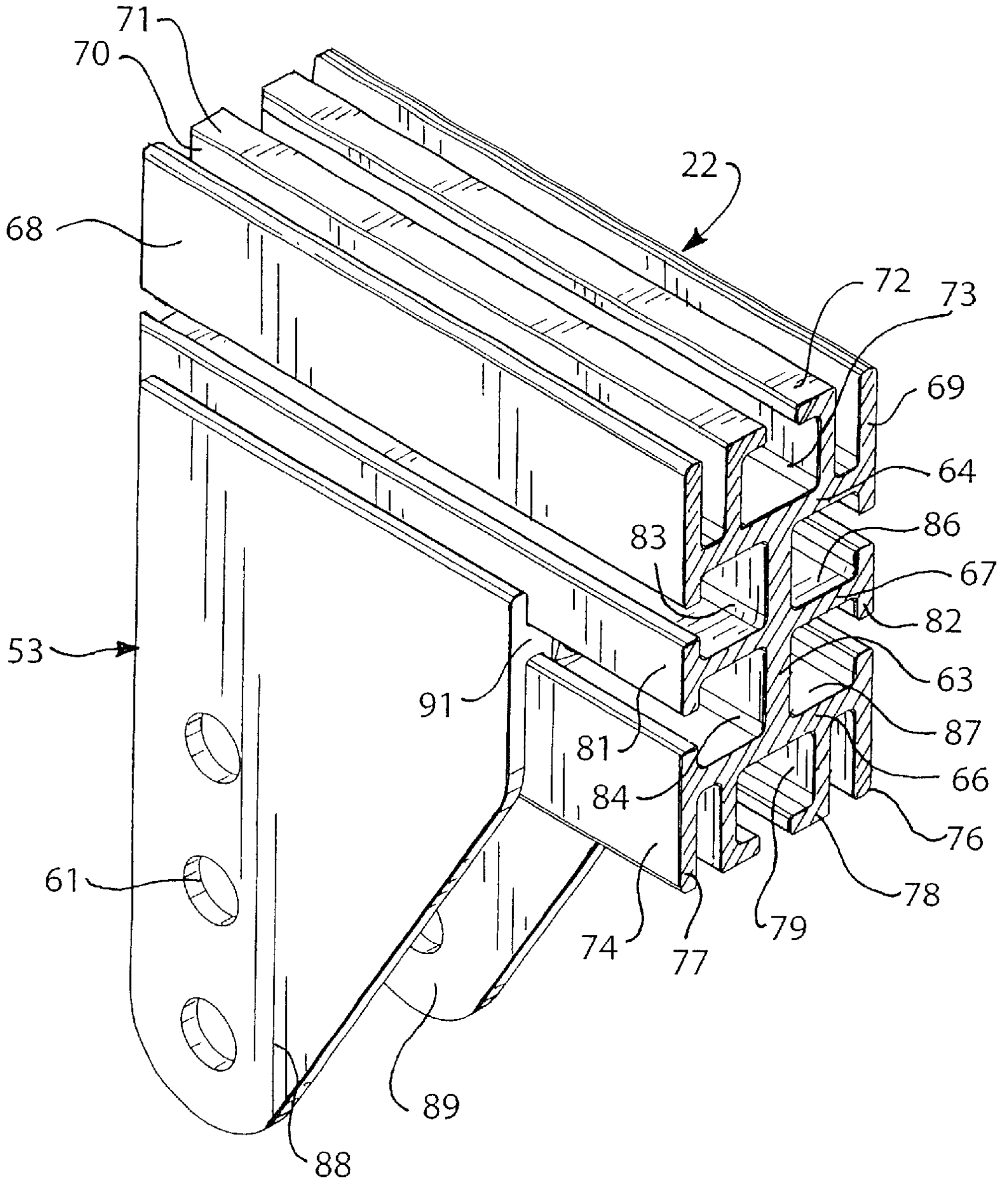
FIG. 6 is a perspective view, partly sectioned, of a beam of the frame assembly shown in FIG. 4.
Figure 7:
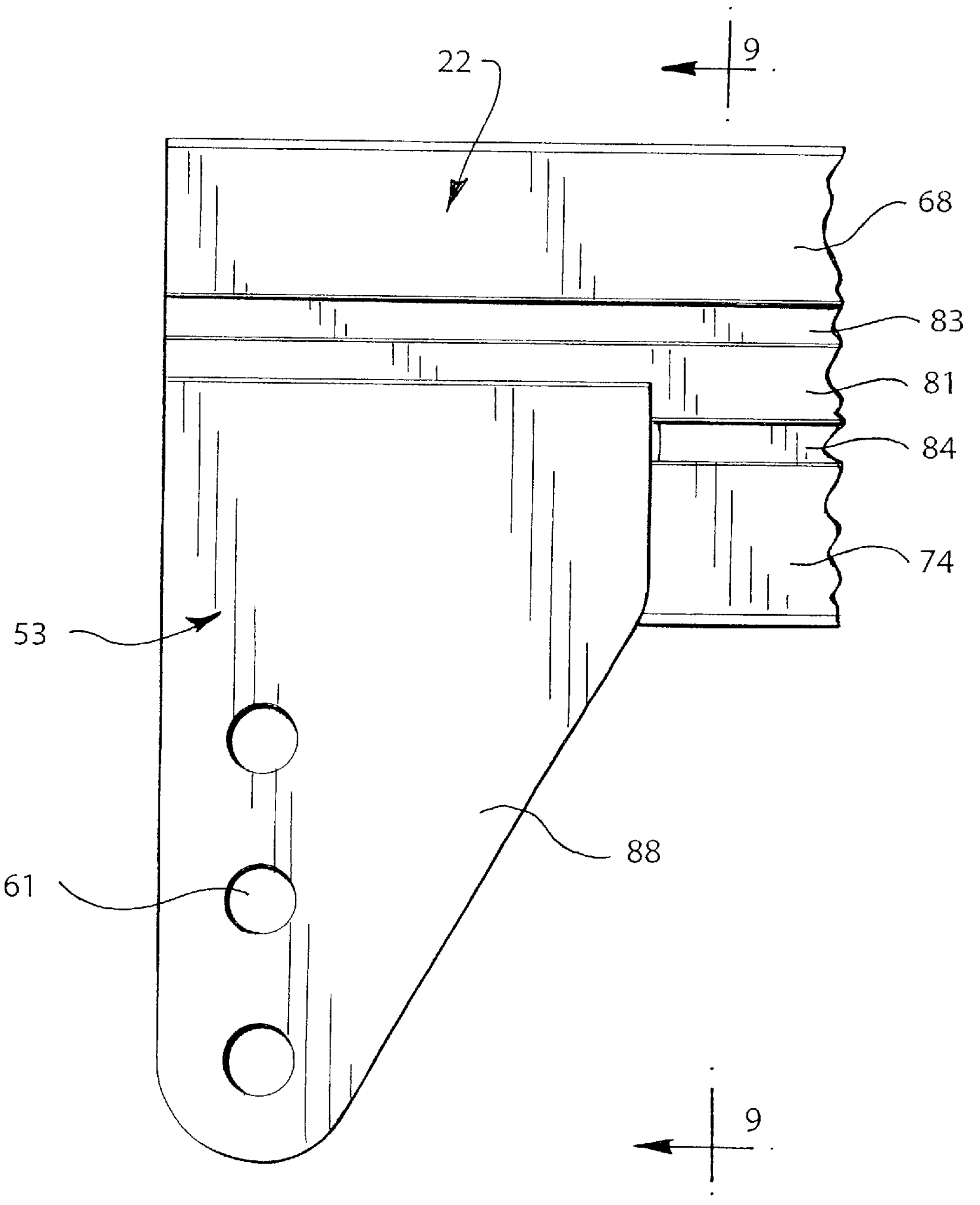
FIG. 7 is a side elevational view of FIG. 6.
Figure 8:
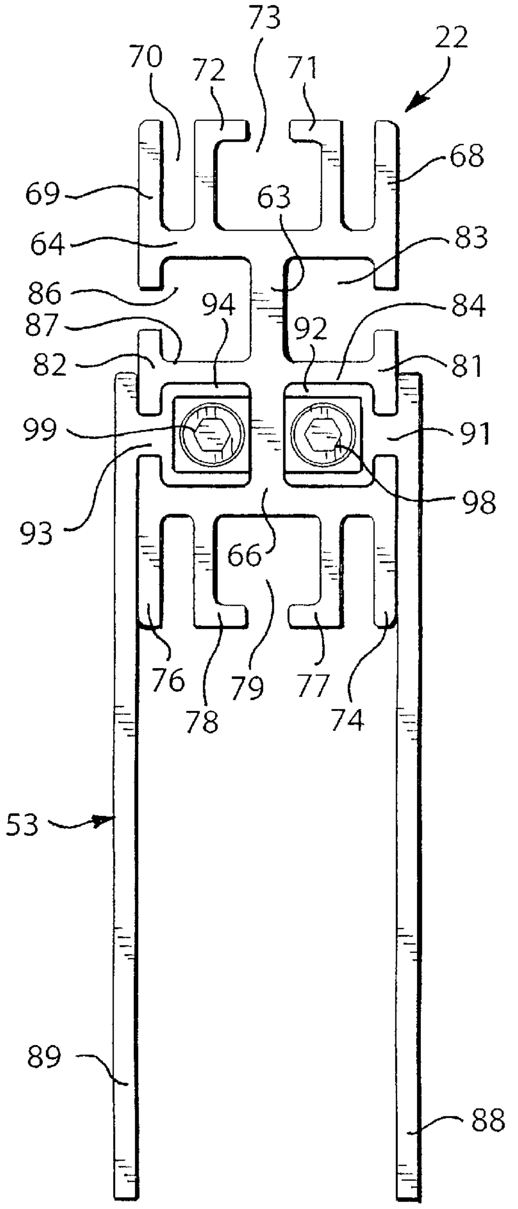
FIG. 8 is an end elevational view of the left end of FIG. 7.
Figure 9:
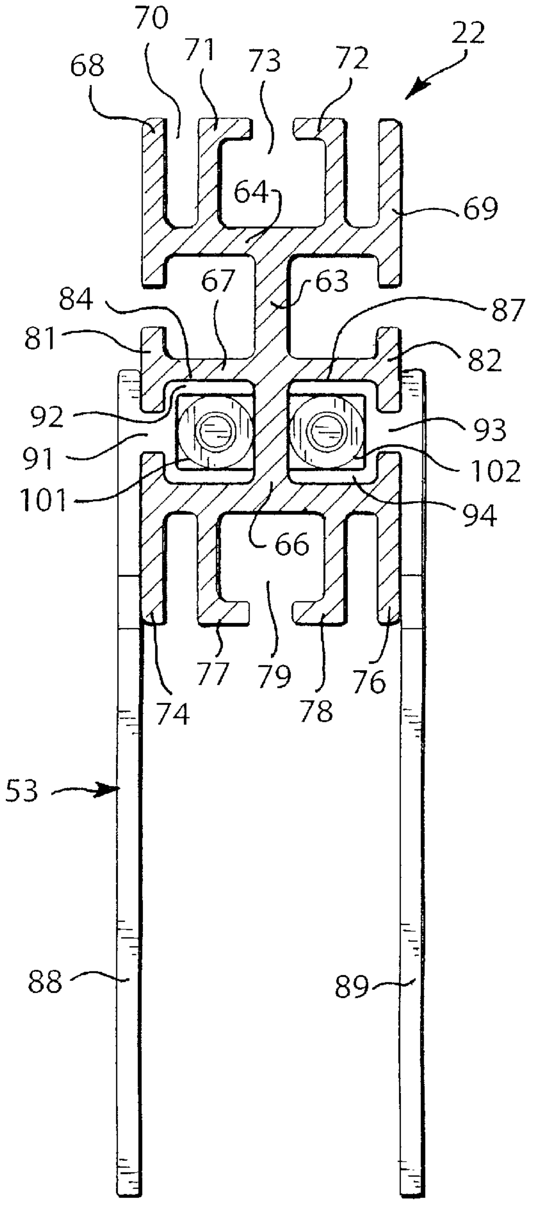
FIG. 9 is a sectional view taken along line 9—9 of FIG. 7.

Supports 36 and 37 mounted on the front ends of beams 22 and 23 are fastened with bolts to tubular members 38 and 39. Foot rest assembly 13 has legs 41 and 42 connected to foot rests 43 and 44 and male members 46 and 47. Male members 46 and 47 are square bars that fit into upright square holes in tubular members 38 and 39 to releasably mount foot rest assembly 13 on frame assembly 12, as shown in FIGS. 3, 4 and 5. Yokes 48 and 49 for front caster wheels 51 and 52 are journaled on members 38 and 39. The yokes 48 and 49 have a number vertically spaced holes for adjusting the positions of the caster wheels. The bolts 50 that secure supports 36 and 37 to members 38 and 39 clamp members 38 and 39 to male members 46 and 47. The upper ends of legs 41 and 42 are pivoted with pins 103 and 104 to male members 46 and 47 to allow foot rest assembly 13 to be adjusted between vertical and horizontal positions. Releasably locking linkages 106 and 107 pivoted to legs 41 and 42 and latched to male members 46 and 47 operate to retain foot rest assembly 13 in a selected adjusted position to facilitate comfort of the person in the wheelchair.

Rear supports or connectors 53 and 54 mounted on the rear ends of beams 22 and 23 connect rear wheels 56 and 57 to frame assembly 12. Horizontal axles 58 and 59 mounted on supports 53 and 54 rotatably support wheels 56 and 57. Supports 53 and 54 have vertically spaced holes 61 and 62 for axles 58 and 49 for vertically adjusting the positions of wheels 51 and 52.

Beam 22 and support 53 of the frame assembly 12 and the releasable and adjustable connecting structure is shown in detail in FIGS. 6 to 10. Beam 23 and support 54 have the same connecting structure as shown in FIGS. 6 to 10. Beam 22 has a central longitudinal vertical rib 63 jointed to a top transverse flange 64, a bottom transverse flange 66 and a central transverse flange 67. Upright longitudinal side members 68 and 69 are joined to opposite ends of flange 64. Longitudinal upright ribs 71 and 72 having inwardly turned ends joined to flange 64 provide a top groove 73. Side member 68 is laterally spaced from rib 71 to provide a linear groove 70 that accommodates the lower edge of side plate 16. Upright longitudinal side members 74 and 76 are joined to opposite ends of flange 66. Longitudinal downwards ribs 77 and 78 having inwardly turned ends provide a bottom groove 79. Longitudinal lips 81 and 82 joined to opposite ends of flange 67 provide four longitudinal grooves 83, 84, 86 and 87. Lips 81 and 82 are vertically aligned with side members 68, 74, and 69, 76, respectively. Beam 22 is a one-piece metal member, such as an extruded aluminum member. Grooves 73, 79, 83, 84, 86 and 87 are shown as having square key hole shapes. These grooves can have cylindrical key hole shapes.

Support 53 has upright plates 88 and 89 extended downwardly from opposite sides of beam 22. The upper end of plate 88 is connected with a neck 91 to a longitudinal U-shaped member 92 located in groove 84. Plate 89 is connected with a neck 93 to a longitudinal U-shaped member 94 located in groove 87.

Figure 10:
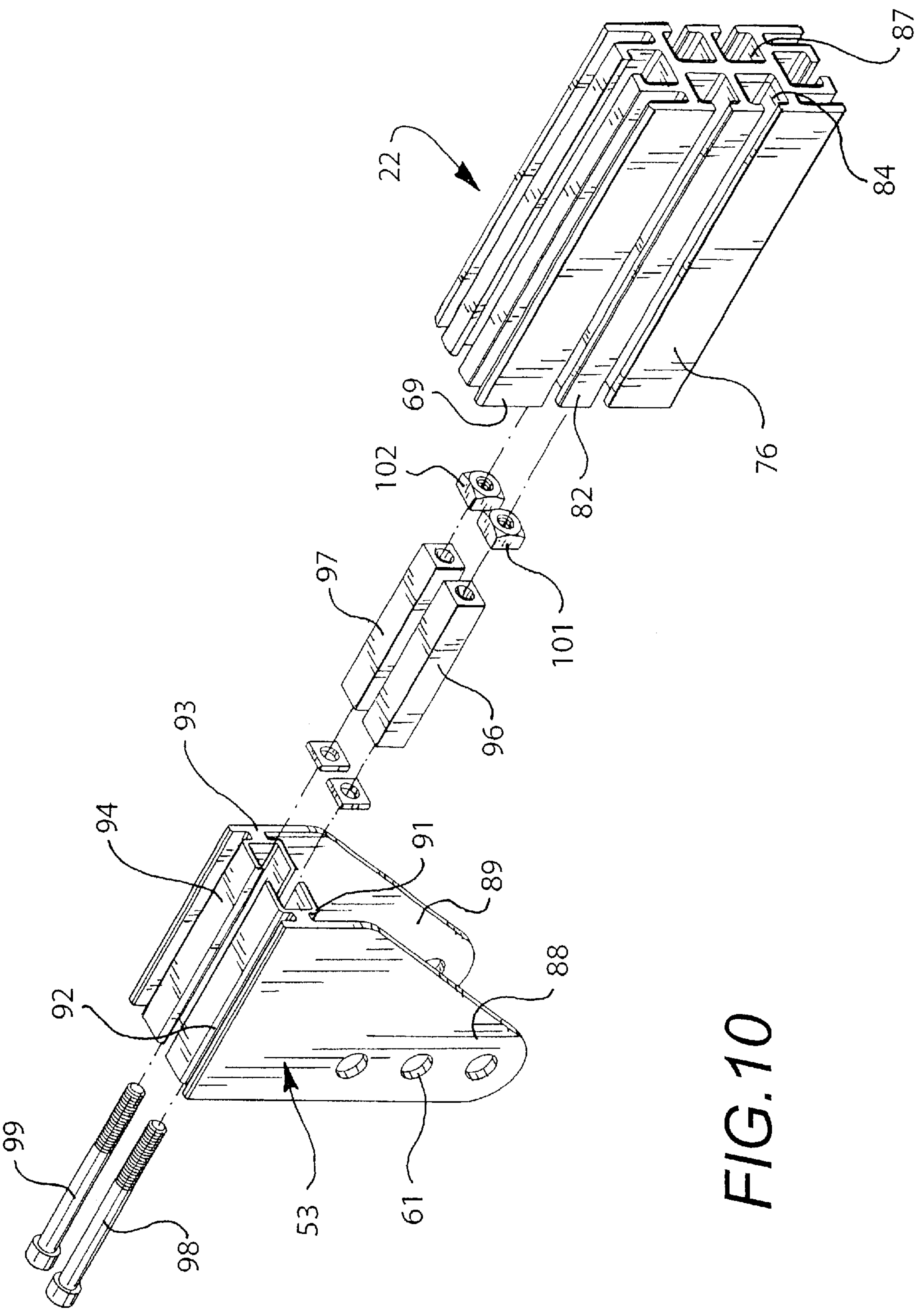
FIG. 10 is an exploded perspective view of the rear support and beam connection.

As shown in FIG. 10, expandable members, shown as U-shaped members 92 and 94, cooperate with a pair of square expansion bars 96 and 97 having longitudinal holes 98 and 99 to clamp U-shaped members 92 and 94 to flanges 66 and 67. Bolts 98 and 99 are threaded on nuts 101 and 102 to expand bars 96 and 97 to expand and hold U-shaped members 92 and 94 in fixed positions on beam 22. Bars 96 and 97 are expandable materials, such as aluminum, plastic and composite materials. Bolts 98 and 99 can be released to remove the compression on bars 96 and 97 whereby support 53 can be moved forward on beam 22 or removed from beam 22. Front supports 36 and 37 are secured to beam 22 with expansion bars, bolts, and nuts, as shown in FIG. 10. Frame beams 22 and 23 allow supports 36, 37, 53 and 54 to be adjusted along the length of the beams and removed for the beams for repair and replacement parts.

Upright connectors 108 and 109 secure supports 31 and 32 to beams 22 and 23. Each connector has upright side plates 111 and 112. Pivot bolts 113 secure plates 111 and 112 to supports 31 and 32 to allow back rest to be angularly adjusted. The upper sections of side plates 111 and 112 have arcuate slots 114 accommodating a locking member or fastener, such as a bolt, that retains the back rest in an adjusted position. Expansion bars (not shown), similar to bars 96 and 97 and bolts 98 and 99, shown in FIG. 10, are used to clamp plates 111 and 112 to beams 22 and 23.

There has been shown and described as embodiment of the wheelchair having grooved beams and supports for wheels and a foot rest releasably mounted on the beams. Changes in the materials, structures and arrangement of the structures can be made by a person skilled in the art without departing from the invention.

What is claimed is:

1. A wheelchair for a person comprising: a frame assembly having a pair of longitudinal beams, each beam having transverse flanges and ribs joined to the flanges providing at least one side groove, cross links connecting the beams, rear supports releasably connected to the beams, front supports releasably connected to the beams, each front and rear support having an expandable member located between said transverse flanges in said side groove, and a member operable to expand the expandable member into non-moving engagement with the beam thereby connecting each front and rear support to the beam, wheels rotatably mounted on the rear supports, a seat assembly mounted on the beams between said wheels, caster wheels mounted on the front supports, and a foot rest assembly mounted on the front supports for supporting the legs and feet of a person seated on the seat assembly.

2. The wheelchair of claim 1 wherein: the member to expand the expandable member is an elongated bar having a longitudinal hole, a bolt extending through said hole, and a nut threaded onto the bolt to compress the bar and expand the bar, said bar and nut compressing said bar thereby expanding the expandable member into non-moving relationship with the beam.

3. The wheelchair of claim 2 wherein: the expandable member is a U-shaped member located in the side groove in the beam, said bar being located in said U-shaped member.

4. A wheelchair for a person comprising: a frame assembly having a pair of longitudinal beams, each beam has side grooves in opposite sides of the beam, cross links connecting the beams, rear supports releasably connected to the beams, front supports releasably connected to the beams, each of said front and rear supports having a pair of plates located adjacent said opposite sides of the beam, each plate having an expandable member located in one of said side grooves, and a member operable to expand the expandable member into engagement with the beam to hold the plate in a non-movable position relative to the beam, wheels rotatably mounted on the rear supports, a seat assembly mounted on the beams between said wheels, caster wheels mounted on the front support, and a foot rest assembly mounted on the front supports for supporting the legs and feet of a person seated on the seat assembly.

5. The wheelchair of claim 4 wherein: the expandable member is a U-shaped member located in the side groove, said member operable to expand the expandable member is located within the U-shaped member whereby the U-shaped member is expandable into non-moving engagement with the beam.

6. The wheelchair of claim 5 wherein: the member operable to expand the U-shaped member is an elongated bar having a longitudinal hole, a bolt extending through said hole, and a nut threaded onto the bolt, said bolt and nut compressing said bar thereby expanding the U-shaped member into non-moving relationship with the beam.

7. The wheelchair of claim 4 wherein: the front supports include upright tubular members and plates secured to the tubular members, connectors releasably securing the plates to the beams, said foot rest assembly having male members that fit in the tubular members to releasably mount the foot rest assembly on the tubular members.

8. The wheelchair of claim 4 wherein: the seat assembly has legs, pivot members connecting the legs to the male members to allow the foot rest assembly to move between vertical and horizontal positions, and releasable latches connected to the legs and male members for holding the foot assembly in a selected position.

9. The wheelchair of claim 4 wherein: the seat assembly includes a base plate and a back rest, said base plate being mounted on said beams, said back rest including upright members, and means releasably connecting the upright members to the beams.

10. A wheelchair for a person comprising: a seat and back rest, frame means for supporting said seat and back rest, said frame means having a pair of longitudinal beams, each beam having transverse flanges and ribs joined to the flanges providing at least one side groove, means connecting the beams, first supports, and second supports, each first and second supports having an expandable member located in the groove, first means releasably connecting the first supports to the beams, said first means each including a member operable to expand an expandable member into non-moving engagement with the beam thereby connecting the first support to the beam, second means releasably connecting the second supports to the beams, said second means each including a member operable to expand an expandable member into non-moving engagement with the beam thereby connecting the second support to the beam, first wheels rotatably mounted on the first supports, and second wheels mounted on the second supports.

11. The wheelchair of claim 10 wherein: each member to expand the expandable member is an elongated bar having a longitudinal hole, a bolt extending through said hole, and a nut threaded onto the bolt to compress the bar and expand the bar, said bolt and nut compressing said bar thereby expanding the expandable member into non-moving relationship with the beam.

12. The wheelchair of claim 11 wherein: the expandable member is a U-shaped member located in the side groove in the beam, said bar being located in said U-shaped member.

13. A wheelchair for a person comprising: a seat and back rest, frame means for supporting said seat and back rest, said frame means having a pair of longitudinal beams, each beam has side grooves in opposite sides of the beam, means connecting the beams, first supports, and second supports, each of said first and second supports having a pair of plates located adjacent said opposite sides of a beam, each plate having an expandable member located in a side groove, a member operable to expand the expandable member to hold the plate in a non-movable position relative to the beam, first wheels rotatable mounted on the first supports, and second wheels mounted on the second supports.

14. The wheelchair of claim 13 wherein: the expandable member is a U-shaped member located in the side groove, said member operable to expand the expandable member is located within the U-shaped member whereby the U-shaped member is expanded into non-moving engagement with the beam.

15. The wheelchair of claim 14 wherein: the member operable to expand the U-shaped member is an elongated bar having a longitudinal hole, a bolt extending through said hole, and a nut threaded onto the bolt, said bolt and nut compressing said bar thereby expanding the U-shaped member into non-moving relationship with the beam.

16. A wheelchair for a person comprising: a frame assembly having a pair of longitudinal beams, each beam having transverse flanges and ribs joined to the flanges providing at least one side groove, cross links connecting the beams, rear supports releasably connected to the beams, and front supports releasably connected to the beams, each rear and front support having an expandable member located in a side groove, and a member operable to expand the expandable member into non-moving engagement with the beam thereby connecting the rear and front supports to the beams, wheels rotatably mounted on the rear supports, a seat assembly mounted on the beams between said wheels, and caster wheels mounted on the front support.

17. The wheelchair of claim 16 wherein: the member to expand the expandable member is an elongated bar having a longitudinal hole, a bolt extending through said hole, and a nut threaded onto the bolt to compress the bar and expand the bar, said bolt and nut compressing said bar thereby expanding the expandable member into non-moving relationship with the beam.

18. The wheelchair of claim 17 wherein: the expandable member is a U-shaped member located in the side groove in the beam, said bar being located in said U-shaped member.

19. A wheelchair for a person comprising: a frame assembly having a pair of longitudinal beams, each beam has side grooves in opposite sides of the beam, rear supports releasably connected to the beams, front supports releasably connected to the beams, each of said front and rear supports having a pair of plates located adjacent said opposite sides of the beam, each plate having an expandable member located in a side groove, and a member operable to expand the expandable member to hold the plate in a non-movable position relative to the beam, wheels rotatably mounted on the rear supports, a seat assembly mounted on the beams between said wheels, and caster wheels mounted on the front support.

20. The wheelchair of claim 19 wherein: the expandable member is a U-shaped member located in the side groove, said member operable to expand the expandable member is located within the U-shaped member whereby the U-shaped member is expanded into non-moving engagement with the beam.

21. The wheelchair of claim 20 wherein: the member operable to expand the U-shaped member is an elongated bar having a longitudinal hole, a bolt extending through said hole, and a nut threaded onto the bolt, said bolt and nut compressing said bar thereby expanding the U-shaped member into non-moving relationship with the beam.

* * * * *